Oct. 20, 1925.
N. O. COUTS
1,557,806
TOWING CABLE
Filed Aug. 16, 1924
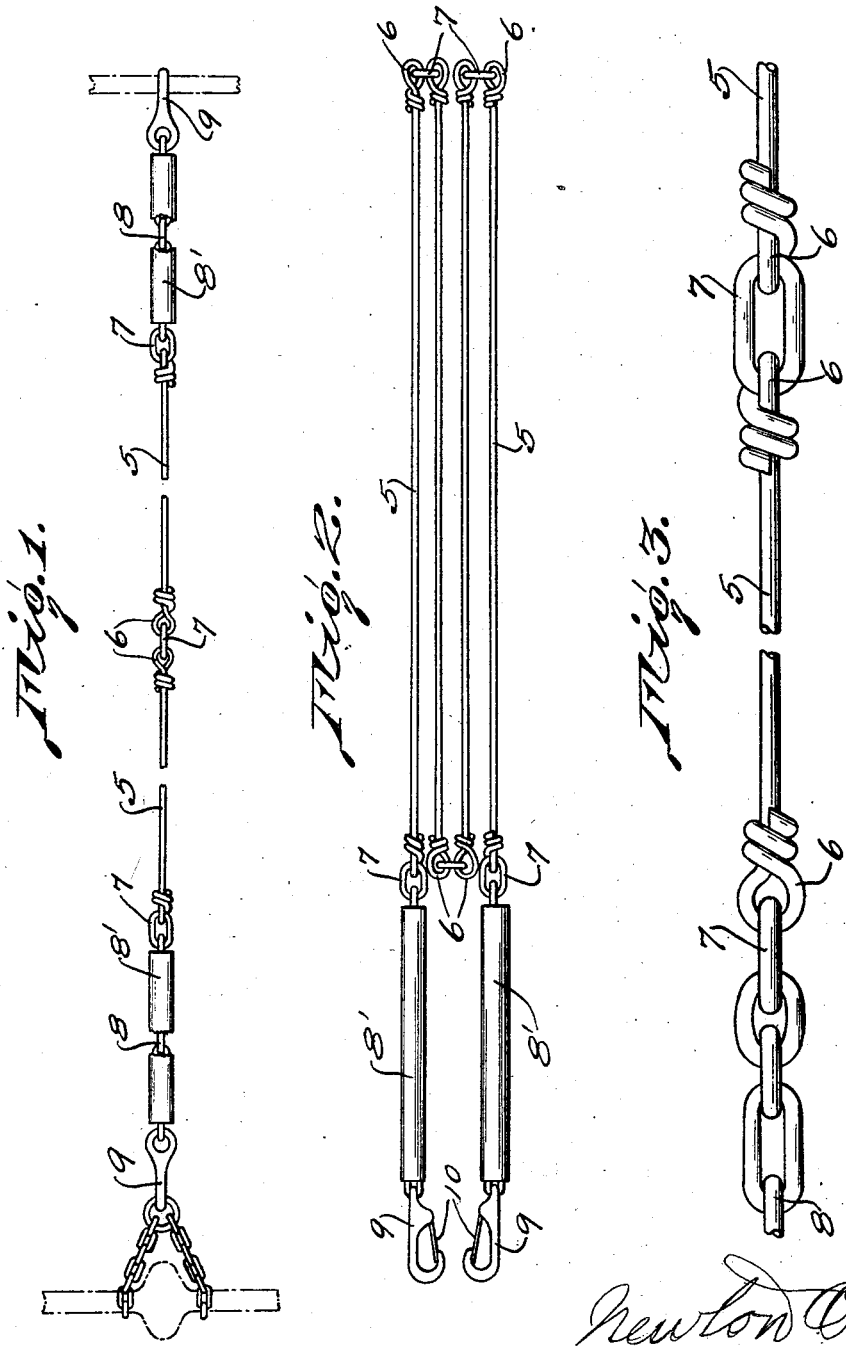

Patented Oct. 20, 1925.

1,557,806

UNITED STATES PATENT OFFICE.

NEWTON O. COUTS, OF BUCYRUS, OHIO.

TOWING CABLE.

Application filed August 16, 1924. Serial No. 732,529.

*To all whom it may concern:*

Be it known that I, NEWTON O. COUTS, a citizen of the United States, residing at Bucyrus, in the county of Crawford and State of Ohio, have invented certain new and useful Improvements in a Towing Cable, of which the following is a specification.

This invention relates to improvements in towing cables for vehicles.

An important object of the invention is to provide a towing cable which may be readily secured in a proper position upon vehicles for towing purposes.

A further object of the invention is the provision of a cable which may be readily collapsed or folded and stored in a comparatively small space in the vehicle.

A further object of the invention is to provide a cable of this character having a plurality of rigid sections in the intermediate portion thereof, preventing the vehicles crashing into one another and tending to retain the line in a suitable position.

A still further object of the invention is to provide a cable of this character which is comparatively simple in construction possessing great strength and one which can be manufactured at a comparatively low cost.

Other objects and advantages of this invention will be apparent during the course of the following description.

In the accompanying drawing forming a part of this specification and in which like numerals are employed to designate like parts throughout the same:

Figure 1 is a plan view showing my improved device connecting with the rear and front axles of a vehicle, Figure 2 is a plan view showing by device in collapsed position, and Figure 3 is an enlarged side elevation showing the means of connecting the sections of my invention.

In the drawing, wherein for the purpose of illustration is shown the preferred form of my invention, the numeral 5 designates one of the rod sections which is constructed of a comparatively long metallic rod provided at each end with loops 6 formed by turning the extremities and winding the same about the main rod section. Any suitable number of these sections may be employed, although I consider it desirable to employ four such sections upon each towing cable. These sections are connected together by substantially oval shape links 7, permitting folding of the sections when it is desired to collapse the same.

The end sections also carry the connecting links 7 to which are secured suitable lengths of chain 8, the extreme ends of the chains carrying a pair of durable snap members 9 which may be secured by springs 10 or in any suitable manner. The chain sections are preferably covered with rubber or other material to prevent scratching or otherwise marring the automobiles towing and being towed.

One of the snap members may be secured upon the front axle of one of the vehicles while the other is secured to a fastening chain mounted on the rear axle of the other vehicle or in any suitable manner sufficient to securely fasten the towing cable without damage to the vehicles.

In using this device, it is apparent that the cable may be readily secured in position whenever it is found necessary to do so, while capable of being conveniently folded and carried when not in use. As shown in Figure 2 the rod sections are readily foldable and assume parallel positions adjacent one another, the chain sections while shown extending in this figure, may be also folded parallel to the rod sections to further reduce the size of the cable in the folded position. It is obvious that this convenient manner of folding the cable will render same easily transportable and capable of being readily mounted when necessary.

It is to be understood that the form of my invention herewith shown and described is to be taken as the preferred example of the same, and that various changes as to the shape, size and arrangement of parts may be resorted to without departing from the spirit of the invention, or the scope of the subjoined claims.

Having thus described my invention, I claim:

1. A towing cable comprising a plurality of stiff rod sections, loop members formed on the extremities of the said rod sections, links positioned through the said loop members and connecting the said rods, chain sections mounted on the extreme ends of the rod sections, means for covering the said chain sections and means for securing the said cable upon vehicles.

2. A towing cable comprising a plurality of rods, engaging loops formed on the extremities of the said rods, connecting links fastened through the said rod loops and adapted to pivotally connect the said rods, flexible extensions secured to the main rod sections, and means for connecting the said flexible extensions upon vehicles.

3. A towing cable comprising a plurality of longitudinal rods, the extremities of the said rods being bent to form loops, connecting links positioned through the said loops to connect the co-acting extremities of the rods, a pair of chains connected on the extremities of the end rod sections, snap fasteners secured to the extreme ends of the chain for connecting the cable upon vehicles.

In testimony whereof, I have affixed my signature.

NEWTON O. COUTS.